United States Patent [19]

Brenner

[11] Patent Number: 4,774,822
[45] Date of Patent: Oct. 4, 1988

[54] COMPACT TRANSMISSION FOR AUTOMATIC WASHER

[75] Inventor: Robert A. Brenner, St. Joseph Township, Berrien County, Mich.

[73] Assignee: Whirlpool Corporation, Benton Harbor, Mich.

[21] Appl. No.: 848,281

[22] Filed: Apr. 4, 1986

[51] Int. Cl.$^4$ .............................................. D06F 37/40
[52] U.S. Cl. ...................... 68/133; 68/23.6; 74/20; 74/21
[58] Field of Search ................ 68/133, 23.6, 23; 74/20, 21, 22 R

[56] References Cited

U.S. PATENT DOCUMENTS

| | | |
|---|---|---|
| 1,220,838 | 4/1917 | George . |
| 1,581,904 | 3/1924 | Xardell . |
| 1,764,302 | 1/1928 | Hauser . |
| 2,116,142 | 4/1936 | Chappell et al. . |
| 2,121,523 | 11/1932 | Geldhof . |
| 2,129,942 | 1/1935 | Kritz . |
| 2,361,821 | 12/1943 | Crowe et al. . |
| 2,441,926 | 7/1946 | Zahn et al. . |
| 2,660,065 | 10/1948 | Williams . |
| 2,681,557 | 12/1951 | Conord . |
| 2,855,783 | 10/1958 | Peters . |
| 2,879,655 | 3/1959 | McCormick . |
| 2,883,183 | 4/1958 | Finsterwalder et al. . |
| 3,075,404 | 1/1963 | Wiedemann ............ 68/23 R U X |
| 3,216,225 | 8/1963 | Gil . |
| 3,279,360 | 5/1964 | Kropp . |
| 3,779,094 | 12/1973 | La Barre . |
| 3,792,616 | 2/1974 | Wentzel . |
| 4,022,076 | 5/1977 | Metz . |
| 4,109,872 | 4/1980 | Metz . |
| 4,199,999 | 4/1980 | Metz . |
| 4,535,642 | 8/1985 | Ohmura . |

Primary Examiner—Harvey C. Hornsby
Assistant Examiner—Frankie L. Stinson
Attorney, Agent, or Firm—Hill, Van Santen, Steadman & Simpson

[57] ABSTRACT

A compact transmission for an automatic washer which converts unidirectional rotary motion to oscillating rotary motion without the use of gears is provided. An input shaft is rotatingly driven by an electric motor and has a reversing thread connection to an intermediate member through a thread follower to cause the intermediate member, which is restrained against rotation, to reciprocate vertically. The intermediate member has an angled cam slot and follower connection with an output shaft which results in oscillating rotary motion of the output shaft. The drive member can be carried on the outside of the coaxial input and output shafts or can be sandwiched between the output shaft and coaxial, nested input shaft.

17 Claims, 4 Drawing Sheets

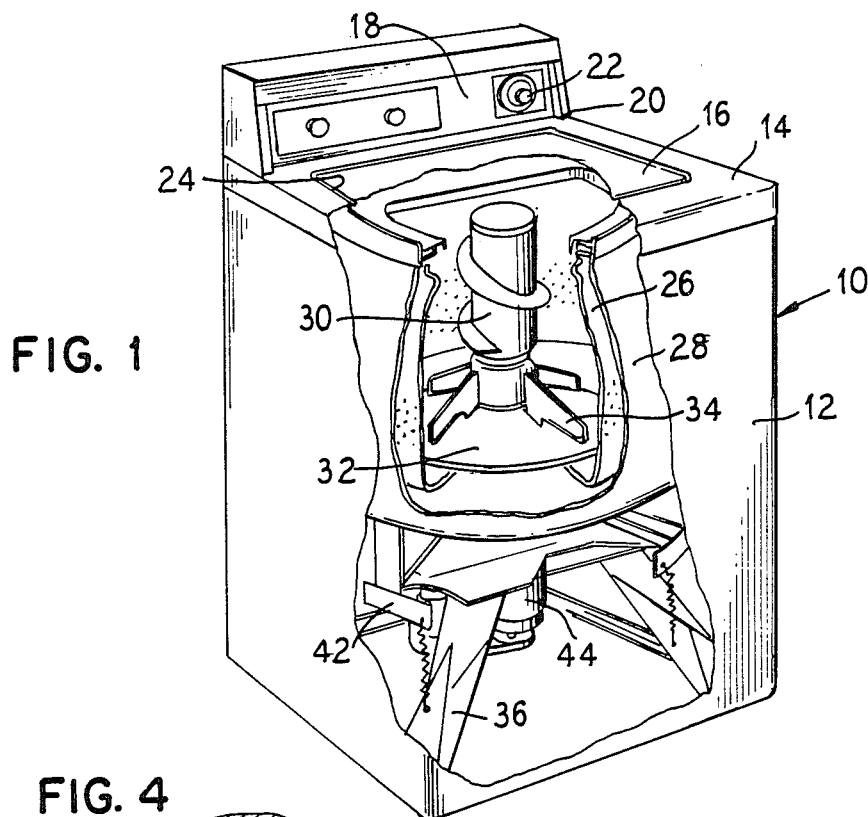
FIG. 1
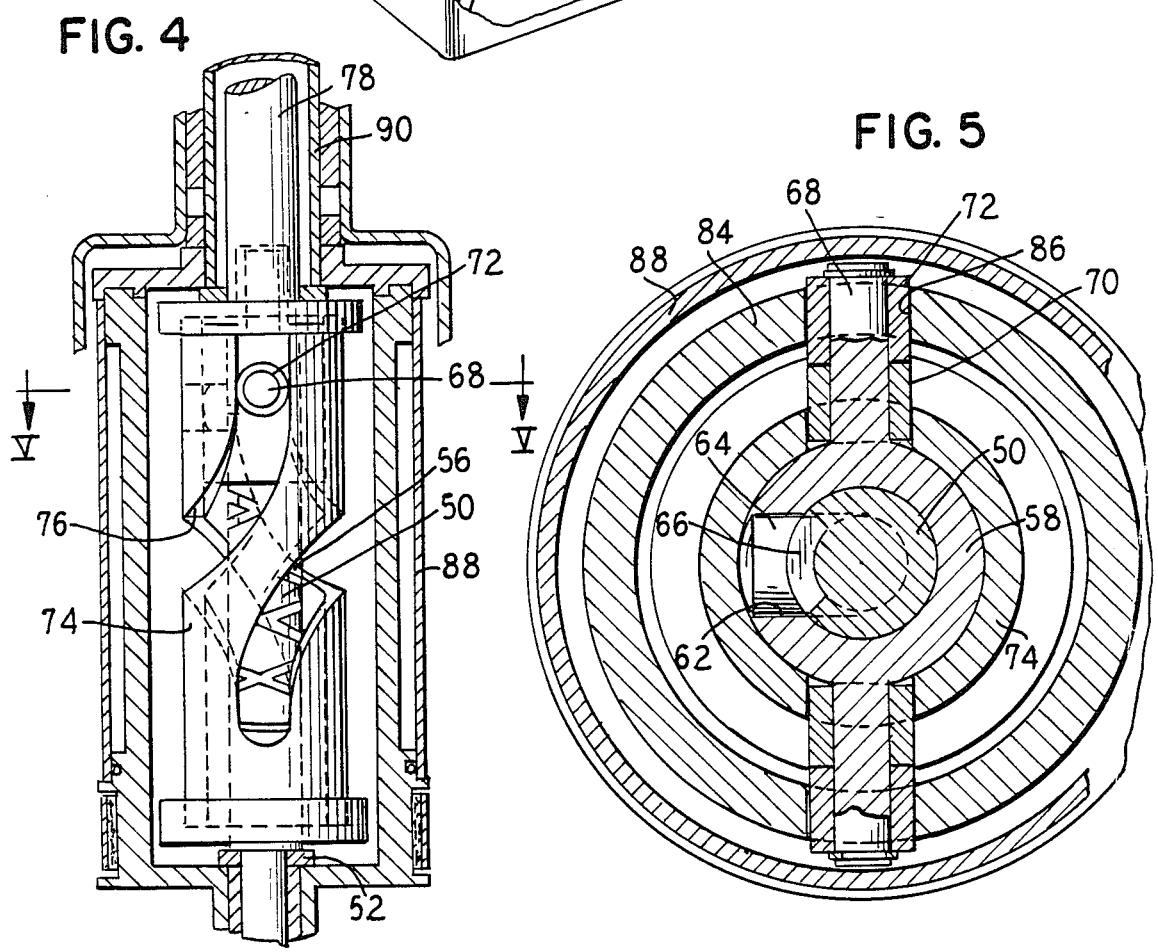
FIG. 4
FIG. 5

COMPACT TRANSMISSION FOR AUTOMATIC WASHER

BACKGROUND OF THE INVENTION

1. Field of the Invention

The present invention relates to a transmission for an automatic clothes washing machine and more particularly to a gearless compact transmission.

2. Description of the Prior Art

Washing machine transmissions are generally fairly bulky and contain gears and other mechanisms required to convert the continuous rotary motion of an electric motor to continuous oscillatory motion in the agitator. Because of the heavy wash loads and mass of water required for washing the clothes, the transmission is generally fairly massive in terms of bulk and strength in order to transmit and convert the necessary torque required to oscillate the agitator within a full wash tub. Thus, the transmission and mechanism for converting continuous rotary motion into continuous rotary oscillating motion needs to be substantial to provide the required torque.

U.S. Pat. No. 3,270,360 discloses a motion conversion mechanism for converting unidirectional rotary motion to oscillating rotary motion through the use of an intermediate member which reciprocates coaxially with the input and output members for use in electric toothbrush. The small, lightweight mechanism disclosed in this patent would not be suitable for use in an automatic washer drive mechanism because of the high level of friction between the rotating cam and the cam follower.

It would thus be advantageous to provide a gearless motion conversion mechanism which is compact in size yet having sufficient strength and capacity to operate as a drive mechanism for an automatic washer.

SUMMARY OF THE INVENTION

The present invention provides a compact transmission for an automatic washer which avoids the use of any gears and which provides a relatively simple means for converting continuous rotary motion into continuous rotary oscillating motion through a reduced number of parts which are sufficiently strong to transmit the necessary forces required in the operation of an automatic washing machine.

A constant rotary motion from a drive motor is transmitted to an input shaft via a pulley and belt arrangement. The input shaft has a right and left hand reversing thread formed on an outer surface thereof and a drive nut is provided which has a central opening sized to permit it to slip over the input shaft. The drive nut has a thread follower carried within it for riding in the left and right hand reversing thread. The drive nut is restrained from rotation, but is free to move vertically. As the input shaft rotates, the drive nut is caused to oscillate linearly in a vertical direction by means of the thread follower riding in the reversing thread.

The agitator shaft is connected to a cylindrical member which has two inclined grooves formed therein which receive pins carried by the drive nut. The agitator shaft is held against vertical movement, but is free to rotate. As the drive nut oscillates vertically, the pins in the drive nut ride in the agitator shaft grooves which are formed at an angle thereby causing the agitator shaft and the agitator to oscillate rotationally.

By varying the pitch of the drive thread from low to high to low along its length, the velocity profile of the agitator shaft can be changed from a constant velocity profile to a changing or sinusoidal velocity profile Another means of changing the velocity profile is to vary the slope of the groove in the agitate cylinder. The number of degrees of rotation of the agitator shaft may be selected by the use of a predetermined number of degrees of the grooves encircling the agitate cylinder.

Therefore, a compact mechanism is provided for converting unidirectional rotary motion to oscillating rotary motion that is suitable for driving an agitator in a vertical axis automatic washer. The mechanism has input and output shafts which are coaxial and provides a motion conversion function which is accomplished through a third member which reciprocates coaxially in response to the unidirectional rotary input. The reciprocating member is coupled to both the input and output shafts through follower means and is restrained against rotational movement as it reciprocates.

The reciprocating element may be spaced radially between the input shaft and the output shaft in one embodiment, or it may ride on the exterior of both shafts, in a second embodiment.

BRIEF DESCRIPTION OF THE DRAWINGS

FIG. 1 is a perspective view of a vertical axis automatic washer embodying the principles of the present invention.

FIG. 4 is a side sectional view of the transmission shown in FIG. 2.

FIG. 5 is a top sectional view taken generally along the lines V—V of FIG. 4.

DESCRIPTION OF THE PREFERRED EMBODIMENTS

Figure 2:
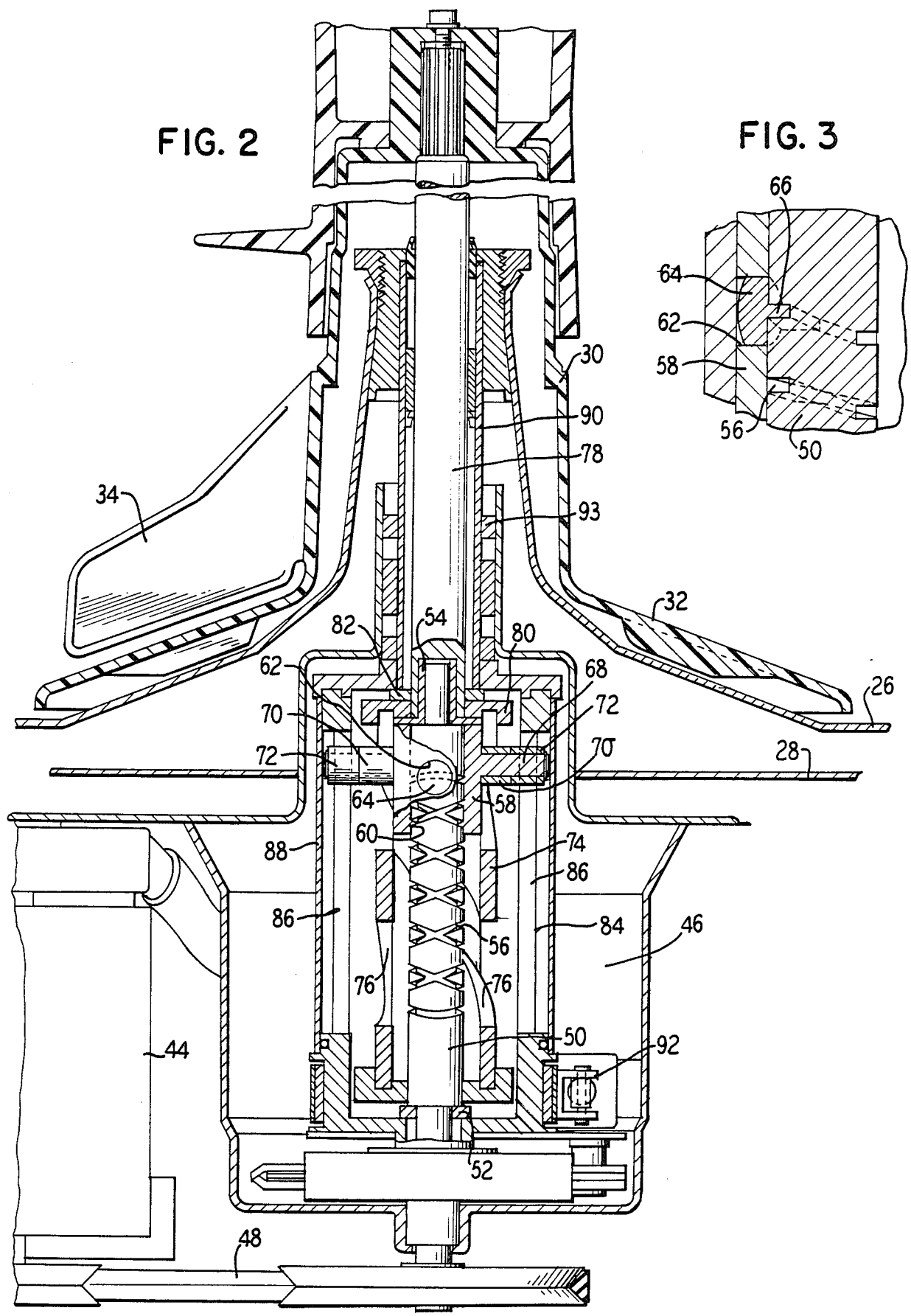
FIG. 2 is a partial side sectional view of an automatic washer agitator and transmission.

FIG. 1 illustrates an automatic washer 10 which embodies the principles of the present invention. The washer 10 has an exterior cabinet 12 with a top surface 14 and an openable lid 16 forming a portion of the top surface. A control console 18 is positioned at a rear edge 20 of the top handle 14 and has on it a plurality of controls 22 for presetting the operation of the washer to operate through a series of washing, rinsing and drying steps.

Accessible through an opening 24 covered by the lid 16 is a perforate wash basket 26 concentrically mounted within an imperforate wash tub 28. Mounted centrally within the wash basket 26 is a vertical axis agitator 30 having a lower skirt portion 32 and radially outwardly extending vanes 34.

The wash tub assembly is carried on supporting legs 36 and a plurality of brackets 42 secured to the tub assembly. The agitator 30 is selectively rotated and oscillated and wash basket 26 is selectively rotated by means of an electric motor 44 through a transmission incorporating the principles of the present invention, as shown in greater detail in the subsequent figures.

Figure 3:
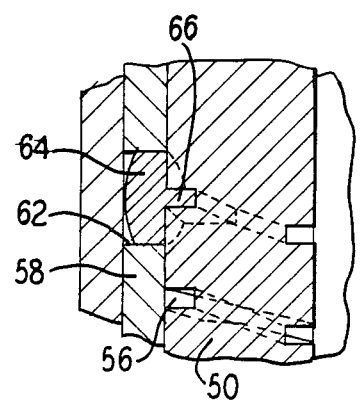
FIG. 3 is a partial sectional view taken generally along the lines III—III of FIG. 2.
Figure 6:
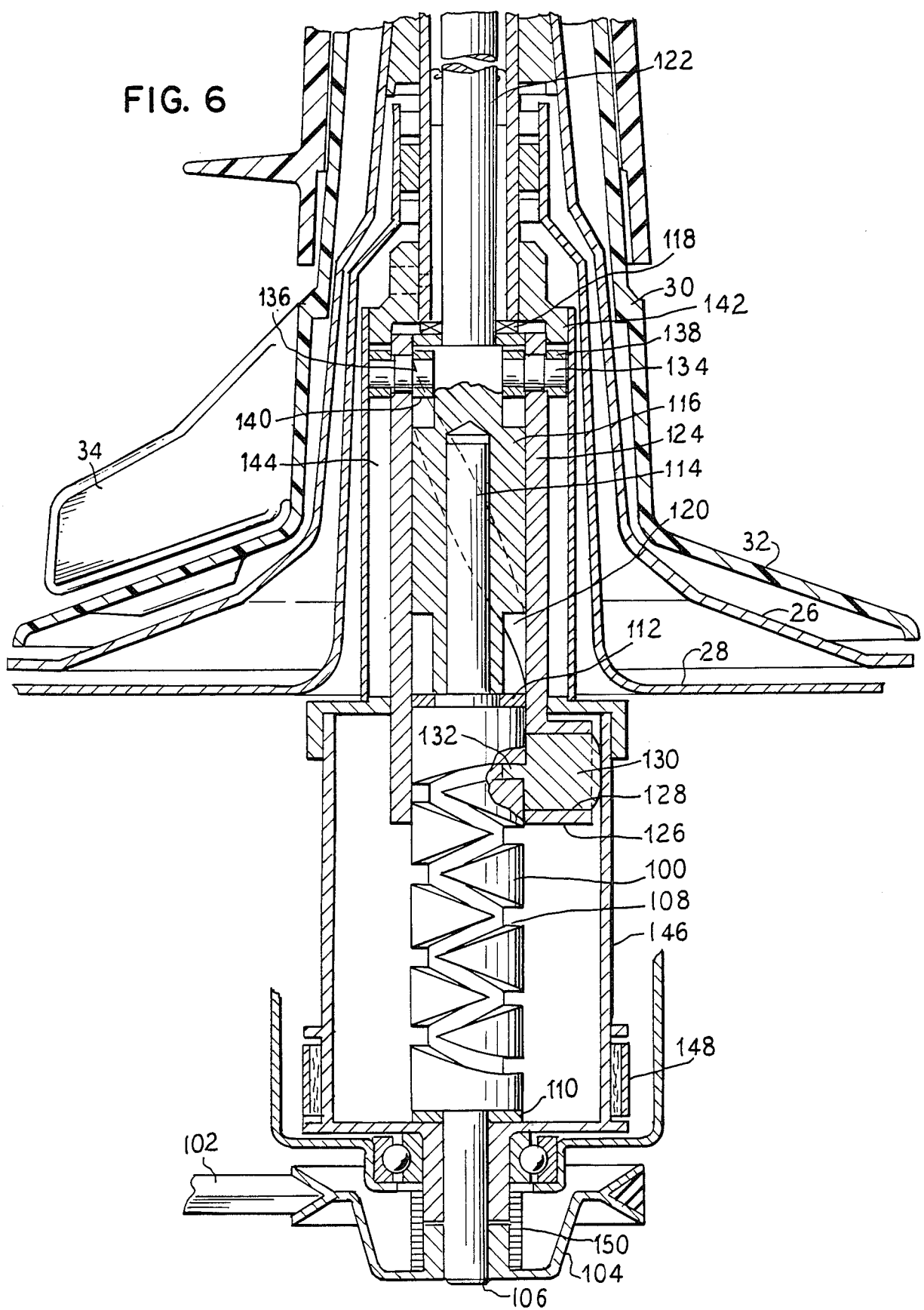
FIG. 6 is a side sectional view of an alternative embodiment of the transmission incorporating the principles of the present invention.
Figure 7:
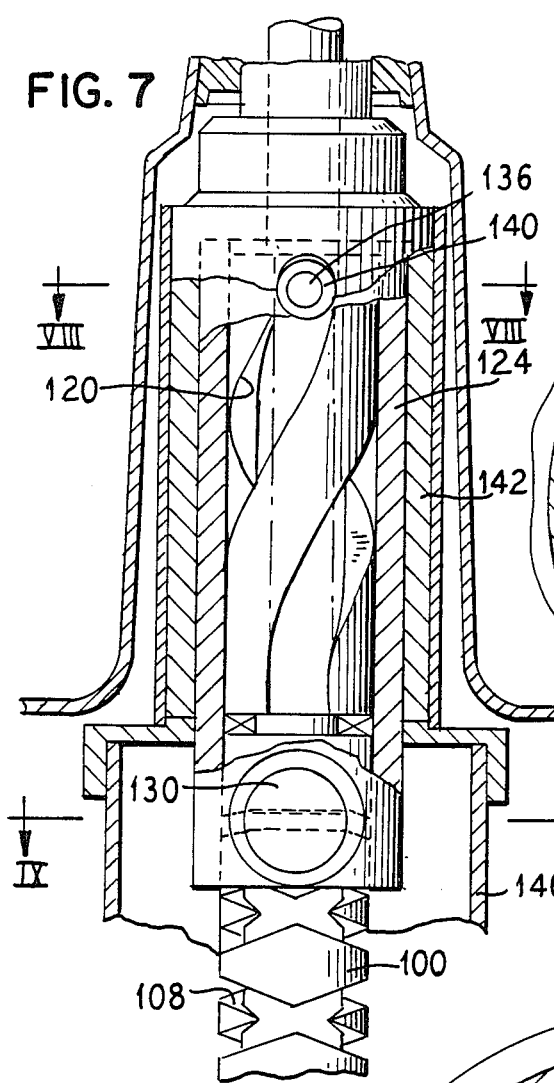
FIG. 7 is a side sectional view of the transmission shown in FIG. 6.
Figure 8:
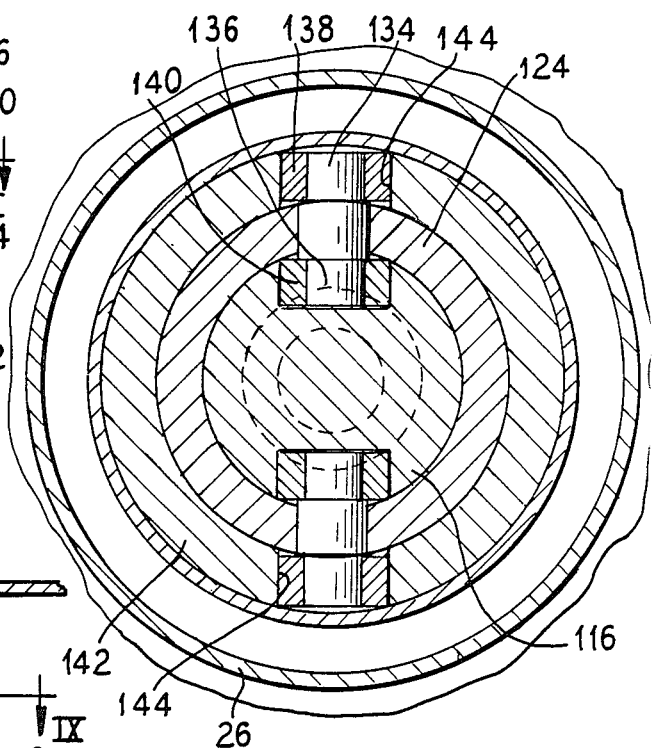
FIG. 8 is a top sectional view taken generally along the lines VIII—VIII of FIG. 7.
Figure 9:
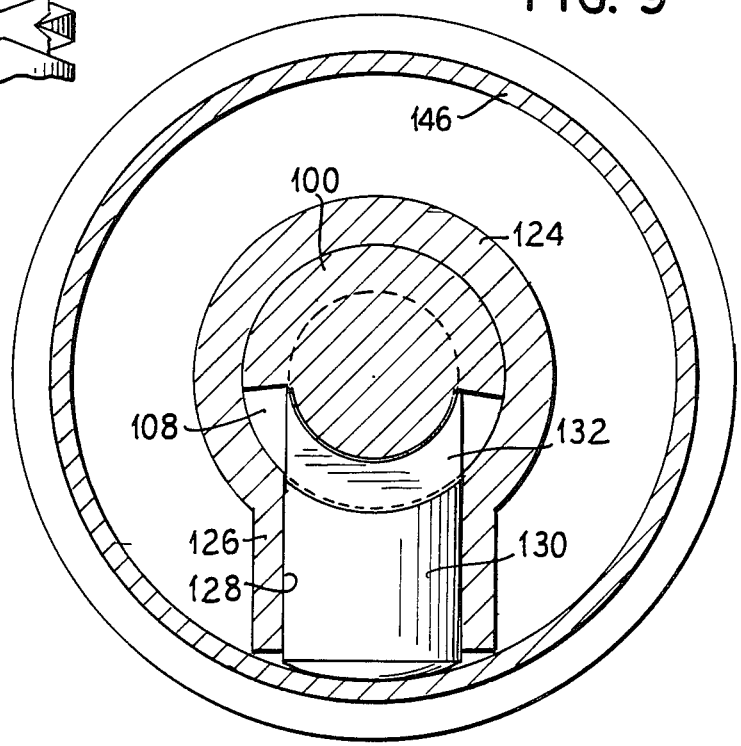
FIG. 9 is a top sectional view taken generally along the lines IX—IX of FIG. 7.

FIG. 2 is a side sectional view through the agitator 30 and a transmission shown generally at 46, which operates to convert rotary motion transmitted by the motor 44 through a drive belt 48 to an input shaft 50. The transmission is shown in detail in FIGS. 3–5.

The input shaft 50 is journalled in a lower set of bearings 52 and an upper bearing 54 which permit and assist the input shaft 50 to rotate about a vertical axis while being held vertically stationary. The input shaft 50 has a left and right hand reversing thread 56 formed on an exterior surface thereof between the points which are journalled in the bearings 52 and 54.

A drive member or drive nut 58 has a central passage 60 which is sized to be closely received on the exterior diameter of the input shaft 50. The drive nut 58 has a radial passage 62 therethrough which receives a rotatable thread follower 64. As seen in greater detail in FIG. 3, the thread follower 64 has a projecting portion 66 which extends into the reversing thread 56 of the input shaft 50. Since the thread follower 64 is rotatably carried within the radial passage 62, the follower 64 can easily make the transition between the right and left hand threads at the top and bottom of its travel. The drive nut 58 has a pair of opposed, radially extending projections 68 which each carry an inner 70 and outer 72 roller bearing thereon.

Mounted concentrically with the input shaft 50 is an agitator cam or output shaft 74 which is in the form of a cylinder having an internal diameter sized to closely receive the external diameter of the drive nut 58. The output shaft 74 has a pair of angled slots 76 formed therethrough which receive the inner roller bearing 70 carried on the radial projection 68 of the drive nut 58. The output shaft 74 is connected to an agitator shaft 78 through a block 80 secured to a top end of the output shaft 74. The block 80 rides against a thrust washer 82 and thereby the output shaft 74 is prevented from moving vertically but is free to rotate about the vertical axis. A cylindrical housing 84 surrounds the concentric assembly of the input shaft 50, the drive nut 58 and the output shaft 74. The housing 84 has a pair of opposed vertical slots 86 formed therein which receive the outer roller bearing 72 carried on the radial projections 68 of the drive nut 58. By so capturing the projection 68 of the drive nut 58, the drive nut is restrained against rotation around the vertical axis but is free to move vertically. A cover 88 in the form of a cylinder further surrounds the entire assembly permitting the space within the cover 88 to be at least partially filled with a lubricating fluid to reduce friction and wear between the moving parts.

The housing 84 is attached to a spin tube 90 which is in turn attached to the basket 26. A conventional solenoid operated brake mechanism 92 operates on a lower portion of the housing 84 to hold the housing, and thus the basket 26 stationary during certain portions of the wash cycle, namely the agitate portion. During the spin portion of the wash cycle, the direction of rotation of the motor 44 is reversed, the brake 92 is released, and a conventional one way clutch (not shown) engages the housing 46. In this mode of operation the housing and basket 26 are free to rotate. The tub 28 remains stationary through the entire wash cycle, and a seal 93 is provided between the tub wall surrounding the agitator and the spin tube 90.

During agitation, the motor 44 rotates the input shaft 50 through the drive belt 48 in a single rotary direction. As the input shaft 50 rotates, the drive nut 58, which is restrained against rotation about the vertical axis, is caused to reciprocate vertically within the slots 86 of the housing 84 by means of the thread follower 64 moving along the reversing thread 56. At the top and bottom points of travel of the drive nut 58, the thread follower 64 is caused to rotate slightly by the configuration of the reversing thread, to permit it to reverse direction and follow the opposite hand thread through the next segment of travel. As the drive nut 58 reciprocates vertically, the output shaft 74 is caused to rotatingly oscillate about the vertical axis by means of the roller bearing 70 engaging the angled slot 76 in the output shaft 74. The output shaft, being connected to the agitator shaft 78 causes the agitator 30 to oscillate within the wash basket. During this time, the brake mechanism 92 holds the housing 84 and, hence, the basket 26, stationary. During a spin cycle, the motor 44 is operated in an opposite direction and the brake mechanism 92 is released, thereby permitting the housing 84 and thus the basket 26 to rotate.

The angle of oscillation of the agitator can be selected by having the slots 76 in the output shaft 74 extend through the desired angle of rotation. Thus, if the slot 76 extends 180° around the circumference of the output shaft 74, then the agitator will likewise move through an angle of 180° in each direction during its oscillatory motion. The speed and acceleration of the agitator 30 can be controlled by the slope and configuration of the slots 76 in the output shaft 74. The steeper the angle of the slot 76, the slower the agitator will rotate.

The velocity profile of the agitator can also be changed by varying the pitch of the thread of the input shaft 50. The pitch of the thread may be varied along the length of the threaded portion to provide a varying velocity profile of the agitator as desired.

A second embodiment of the present invention is illustrated in FIGS. 6–9. In this embodiment, there is again an input shaft 100 which is driven by the electric motor through a drive belt 102 which operates a pulley 104 connected to the input shaft 100 at a lower end 106. The input shaft 100 has a reversing thread 108 formed on an exterior surface thereof. The input shaft 100 is free to rotate about a vertical axis and is positioned between a bottom thrust bearing 110 and a top thrust bearing 112 to retain the input shaft 100 against vertical movement. An upper end of the input shaft 100 comprises a smaller diameter extension 114 which extends into an output agitator shaft 116. A bottom end of the output shaft 116 rides on the thrust bearing 112 and an upper end of the output shaft rides on a thrust bearing 118 whereby the output shaft 116 is held against vertical movement but is free to rotate about a vertical axis. The output shaft 116 has a pair of helical grooves 120 formed on an outer surface thereof. The output shaft 116 is also formed integrally with or permanently attached to an agitator shaft 122 which is connected to the agitator 30.

A drive nut 124 which generally has the shape of a cylinder has an interior diameter sized to closely receive the external diameter of the input shaft 100 as well as the exterior diameter of the output shaft 116. Near a lower end of the drive nut 124, there is formed a boss 126 with a cylindrical passage 128 sized to rotatingly receive a thread follower 130. The thread follower 130 has a radially inwardly extending projection 132 which extends into and follows the reversing thread 108 of the input shaft 100. An upper end of the drive nut 124 has a pair of radially outwardly 134 and radially inwardly 136 extending projections. The outwardly extending projections 134 have roller bearings 138 secured thereto and the inwardly extending projections 136 have roller bearings 140 secured thereto. The roller bearings 140 carried on the inwardly extending projections 136 are received in the helical slots 120 of the output shaft 116.

An upper housing 142 encloses the output shaft 116 and an upper portion of the drive nut 124. The housing 142 has a pair of opposed vertical slots 144 formed therein which receive the roller bearings 138 carried on the outwardly extending projections 134 of the drive nut 124. In this manner, the drive nut is restrained against rotation around the vertical axis but is free to move vertically. The upper housing portion 142 is connected to a lower housing portion 146 which encloses the input shaft 100 and lower portion of the drive nut 124. The diameter of the lower housing portion 146 is such that the thread follower 130 engages the inner diameter of the lower housing 146 so that the thread follower 130 is held in place radially as it moves along the reversing thread 108. A conventional brake 148 is utilized to hold the lower housing 146 stationary during selected portions of the wash cycle. The lower housing 146 is integrally connected to the upper housing 142 which in turn is connected to the wash basket 26.

In operation, the input shaft 100 is unidirectionally rotated about the vertical axis while being held stationary vertically, which causes the drive nut 124 to reciprocate vertically within the vertical slots 144 of the upper housing 142. The vertical reciprocation is caused by the thread follower 130 being carried along the reversing thread 108. As the drive nut 124 reciprocates vertically, the output shaft 116 is caused to oscillate about the vertical axis by means of the sliding and camming connection between the drive nut 124 and the slot 120 of the output shaft 116. Thus, the agitator 30 is caused to oscillate, since it is connected to the output shaft 116.

A conventional one-way spring clutch 150 is used to couple continuous rotary motion from pulley 104 to the lower portion of housing 146 and, hence, to wash basket 26, when rotation of the motor 44 is reversed to cause a spin operation.

As was described above, the velocity profile of the agitator can be adjusted by varying the pitch of either the output shaft slot 120 or the input shaft thread 108, and the angle of oscillation of the agitator can be selected by having the slot 120 of the output shaft extend through the desired angle around the circumference of the output shaft.

From the foregoing discussion, it is seen that the present invention provides a compact transmission for an automatic washer which converts unidirectional rotary motion to oscillating rotary motion without the use of gears, but in a reliable and simple fashion through the use of an input shaft, an output shaft and an interconnecting reciprocating drive nut. The drive nut can be carried on the outside of both the input shaft and output shaft or can be sandwiched between the output shaft and a nested input shaft.

As is apparent from the foregoing specification, the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

The embodiments of the invention in which an exclusive property or privilege is claimed are defined as follows:

1. In a clothes washing machine having a tub for receiving fabrics to be washed and an agitator positioned within said tub for agitation of said fabrics, a drive assembly for said agitator comprising:
   a rotary input shaft;
   an oscillatory output shaft connected to said agitator and mounted coaxially to said input shaft;
   an intermediate drive member interconnected between said input shaft and said output shaft and mounted coaxially to both said input and output shafts for reciprocatory motion relative thereto;
   restraining means for selectively restraining rotational movement of said intermediate drive member;
   first motion converting means interconnecting said input shaft and said intermediate drive member for converting rotary motion of said input shaft into reciprocating motion of said intermediate drive member; and
   second motion converting means interconnecting said intermediate drive member and said output shaft for converting reciprocating motion of said intermediate drive member into oscillating rotary motion of said output shaft.

2. A drive assembly according to claim 1 wherein said input shaft is nested within said output shaft and said drive member is sandwiched between said input shaft and output shaft.

3. A drive assembly according to claim 1 wherein said output shaft has a diameter equal to that of the input shaft and is mounted above said input shaft and said drive member is mounted on the exterior diameter of said two shafts.

4. A drive assembly according to claim 1 including a housing surrounding said input and output shafts and said drive member, wherein said restraining means comprises a cooperating vertical slot and a projection between said drive member and said housing.

5. A drive assembly according to claim 4 wherein said vertical slot is formed in said housing.

6. A drive assembly according to claim 1 wherein said first motion converting means comprises a reversing thread formed on said input shaft and a thread follower carried by said drive member.

7. A drive assembly according to claim 1 wherein said second motion converting means comprises a cooperating cam slot and follower between said drive member and said output shaft.

8. A drive assembly according to claim 7 wherein said cam slot is formed in said output shaft.

9. In a clothes washing machine having a tub for receiving fabrics to be washed and an agitator positioned within said tub for agitation of said fabrics, a drive assembly for said agitator comprising:
   an input shaft journalled for rotary motion;
   an output shaft connected to said agitator and having at least a portion of its length in the form of a cylinder mounted coaxially with said input shaft and journalled for rotary motion;
   an intermediate drive member mounted coaxially around said input shaft and said output shaft;

a housing coaxially surrounding the assembly of said input shaft, said output shaft and said drive member;

restraining means comprising a cooperating vertical slot and projection between said drive member and said housing;

a first motion converting means comprising a cooperating reversing thread and thread follower between said input shaft and said drive member;

a second motion converting means comprising an angled cam slot and follower between said drive member and said output shaft;

whereby, rotary motion of said input shaft is converted to vertical reciprocating motion of said drive member through said thread and thread follower and the vertical reciprocating motion of said drive member is converted to oscillatory rotary motion of said output shaft through said follower and angled cam slot.

10. A drive assembly according to claim 9 wherein said vertical slot is formed in said housing.

11. A drive assembly according to claim 9 wherein said reversing thread is formed on said input shaft.

12. A drive assembly according to claim 9 wherein said angled cam slot is formed in said output shaft.

13. In a clothes washing machine having a tub for receiving fabrics to be washed and an agitator positioned within said tub for agitation of said fabrics, a drive assembly for said agitator comprising:

an input shaft journalled for rotary motion;

an output shaft connected to said agitator having the form of a cylinder being mounted coaxially with said input shaft and journalled for rotary motion;

an intermediate drive member mounted coaxially around said input shaft and said output shaft;

a housing coaxially surrounding the assembly of said input shaft, said output shaft and said drive member;

said input shaft having a reversing thread formed on an exterior surface thereof;

said output shaft having at least one angled groove formed on an exterior surface thereof;

said housing having at least one vertical slot;

said drive member carrying a rotatable thread follower engagable with said thread of said input shaft;

said drive member having a radially inwardly extending projection engagable with said angled groove and a radially outwardly extending projection engagable with said vertical slot;

whereby, rotary motion of said input shaft is converted to vertical reciprocating motion of said drive member through said thread and thread follower and the vertical reciprocating motion of said drive member is converted to oscillatory rotary motion of said output shaft through said projection and angled slot.

14. A transmission comprising:

an axially stable first element rotatable in an angular direction;

an angularly stable second element reciprocable along the axis of said first element;

reversing thread and follower means operatably disposed between said first and second elements whereby said second element reciprocates in response to rotation of said first element;

an angularly oscillatable third element concentrically disposed with respect to said second element; and a helical thread and follower means between said second and third elements, whereby said third element will be oscillated angularly as a function of the reciprocation of the second element axially;

whereby, a continuous rotatable power input may be converted to an oscillating rotary motion.

15. In an automatic washer of the type having an agitator adapted to be oscillated in a treatment zone, an improved transmission comprising a rotatable input shaft means adapted to be connected to an electrical motor for continuous rotation in an angular direction:

an angularly oscillatable output element adapted to be oscillated through an angular stroke and adapted to be connected to the agitator of a wash machine; and an intermediate transition means comprising an angularly stable element, with continuous reversing thread and follower means formed between said angularly stable transition element and said input shaft means, thereby to reciprocate said transition element axially in response to rotation of said input shaft means; and helical slot and follower means between said transition element and said output element to angularly oscillate said output element in response to axial reciprocation of said transition element;

whereby, the continuous rotation of said input shaft means is converted into oscillating rotary motion of said agitator.

16. The method of angularly oscillating the agitator of a vertical axis automatic washing machine which includes the continuously angularly rotating a first input shaft means with an electrically operated drive motor;

restraining said input shaft means against axial displacement while journalling said input shaft means for such continuous angular rotation;

axially reciprocating an intermediate transition element as a function of the continuous rotation of said input shaft means;

angularly restraining said transition element against angular displacement while supporting said transition element for axial reciprocation relative to said input shaft means;

angularly rotating an output member element through an oscillation stroke in response to axially reciprocation of said transition member;

axially restraining said output member against axial displacement while supporting said driving member for angular rotation; and driving the washing machine agitator in unison with the output member through a cyclical oscillation stroke.

17. For use in an automatic washing machine in converting a continuous rotational drive of an electrical motor to an oscillating rotary motion of an agitator within a washing zone:

a first element comprising an input shaft adapted to be connected to an electric drive motor for continuous angular rotation in one direction;

mounting means for restraining said input shaft against axial displacement, thereby rendering said input shaft axially stable, while journalling said input shaft for rotation;

continuous reversing thread means formed in the external surface of said input shaft;

an axially reciprocable transition element concentrically disposed with respect to said input shaft and closely adjacent thereto radially outwardly thereof;

means mounting said transition element for axial reciprocation while restraining said transition element against angular displacement;

follower means between said input shaft and said transition element cooperatively engaging said continuous reversing thread means, whereby said transition element will reciprocate axially in response to continuous rotation of said input shaft;

an output element disposed concentrically with respect to said input shaft;

mounting means carrying said output element for angular rotation while restraining said output element against axial displacement;

helical slot and follower means between said transition element and said output element interengaging with one another to angularly oscillate said output element as a function of the axial reciprocation of said transition element; and means drivingly coupling said output element to the washing machine agitator, thereby to oscillate the washing machine agitator in unison with the motion of the output element.

* * * * *